UNITED STATES PATENT OFFICE.

FRANZ GATZSCHE, OF FREIBERG, GERMANY, ASSIGNOR TO THE "N. L" SYNDICATE, LIMITED, OF LONDON, ENGLAND.

COMPOSITION OF MATTER FOR SOLES AND HEELS OF BOOTS OR SHOES.

SPECIFICATION forming part of Letters Patent No. 636,657, dated November 7, 1899.

Application filed August 31, 1899. Serial No. 729,110. (No specimens.)

*To all whom it may concern:*

Be it known that I, FRANZ GATZSCHE, manager, a subject of the German Emperor, residing at Freiberg, Saxony, in the Empire of Germany, have invented a certain new and useful Composition of Matter to be Used for Making the Soles and Heels of Boots or Shoes; and I do hereby declare the following to be a full, clear, and exact description of the invention, such as will enable others skilled in the art to which it appertains to make and use the same.

My invention consists of the following ingredients combined in the proportions stated, viz: waste of paper-manufactories, four to five pounds; asphaltum, one pound; resin, one-half pound; turpentine-oil, one-fourth pound; peroxid of iron, two ounces; tallow, one-fourth pound.

The paper-waste is placed in a mixture of the other ingredients, heated to a temperature of 80° centigrade, and is left therein until it is entirely impregnated with the mixture. The entire mixture is then pressed by passing it between rollers and formed into sheets of suitable thickness, from which soles and heels for boots and shoes are made.

The soles and heels made from the mixture specified make an excellent substitute for the leather ordinarily used for the purpose, and they are cheap, easily manufactured, durable, elastic, and completely waterproof.

I am aware that some of the ingredients named have been used for a similar purpose, but I am not aware that all the ingredients of my composition in the proportions stated have been used together.

What I claim, and desire to secure by Letters Patent of the United States, is—

The herein-described composition of matter to be used for making the soles and heels of boots and shoes, consisting of waste from paper-manufactories, asphaltum, resin, turpentine-oil, peroxid of iron, and tallow, in the proportions specified.

In testimony whereof I have hereunto affixed my signature in presence of two witnesses.

FRANZ GATZSCHE.

Witnesses:
 WM. O. BROWN,
 ARTHUR E. EDWARDS.